United States Patent Office 3,014,886
Patented Dec. 26, 1961

3,014,886
METHOD OF IMPROVING THE BINDER EFFICIENCY OF A PHENOL-FORMALDEHYDE REACTION PRODUCT BY ADDITION THERETO OF AN ACRYLAMIDE POLYMER, AND PRODUCT OBTAINED THEREBY
James Harding, Bound Brook, N.J., assignor to Union Carbide Corporation, a corporation of New York
No Drawing. Filed Mar. 7, 1958, Ser. No. 719,728
19 Claims. (Cl. 260—43)

This invention relates to improved water-dilutable, heat-hardenable phenol-formaldehyde reaction products. More particularly, this invention relates to water-dilutable, heat-hardenable phenol-formaldehyde reaction products containing an acrylamide polymer, and having particular utility in the bonding of mineral fibers such as glass, rock wool and the like.

Millions of pounds of water-dilutable, heat-hardenable phenol-formaldehyde reaction products are consumed annually as binders in the production of mineral fiber batts and other semi-compacted structures which have found wide acceptance in the fields of thermal and acoustical insulation. Such structures are dependent upon the "phenolic" binder for permanently bonding the fibers into a coherent structure.

The mineral fiber batts are generally produced by blowing a stream of molten glass or slag with high pressure steam in such a manner that the glass or slag stream is drawn into fibers of random lengths. The fibers, while in transit in a forming hood or blow chamber and while still hot from the drawing operation, are sprayed with an aqueous solution of a heat-hardenable phenol-formaldehyde reaction product, and thereafter allowed to settle into a continuous mat onto an endless foraminous conveyor belt. Generally, there is sufficient residual heat in the mineral fibers to volatilize substantially all of the water from the "phenolic" binder, leaving the binder on the fibers in a viscous or semi-viscous state but virtually anhydrous. The coated or sprayed fibers, in the form of a batt, are then transferred to a curing oven where they are heated by air blown through the batt at temperatures on the order of 230°–290° C. The relatively high temperatures effect a curing of the binder to an infusible state in about seven minutes.

Depending upon the type of mineral fiber structures desired, the binder may constitute as little as 2 percent by weight of the total structure in the production of low density, relatively fluffy type structures; or as much as 20 percent by weight for high density structures having considerable resistance to deformation.

The water-dilutable, heat-hardenable phenol-formaldehyde reaction products suitable for use as binders in the aforementioned process for the production of mineral fiber semi-compacted structures must have a high "binder efficiency" in addition to possessing the minimum requirements of (1) water-dilutability, (2) ability to retain commercially acceptable water-dilutability characteristics on storage, (3) adequate penetration and bonding characteristics. Binder efficiency refers to the percentage of phenol-formaldehyde product remaining in the cured structure as compared to the amount of product sprayed into the forming hood or chamber. Under normal conditions of operation, binder efficiency, which indicates the amount of "resin loss," is of particular concern to the user, since as little as a 2 percent difference represents a significant item in actual product cost.

Binder efficiency is generally determined by spraying, over a 5 minute interval, a 10 milliliter sample of a phenol-formaldehyde reaction product in aqueous solution, having a solids content of about 50 percent, into the interior of a weighed, unsized glass cloth cone supported in an open mesh cone-shaped screen, by means of a stream of air preheated to a temperature of about 210° to 230° C. The sprayed glass cloth cone is allowed to remain in the air stream an additional 5 minutes to insure a complete curing of the phenol-formaldehyde product. The cone is then cooled and weighed and the binder efficiency calculated from the expression:

$$E = \frac{100W}{R \times S}$$

wherein W is the increase in weight of the glass cloth cone; R is the weight of the phenol-formaldehyde solution used to spray the cone; S is the weight of the solids in the phenol-formaldehyde solution expressed as weight percent as determined by heating a two gram sample of the solution diluted with 10 milliliters of distilled methanol for 2 hours at 149° C. in an open, flat bottom container such as a 2 oz. capacity Gill style ointment box.

The "resin loss" incurred in the preparation of mineral fiber batts, and reflected in the binder efficiency is due in part to the high curing temperatures which volatilize a considerable portion of the solids content of the phenol-formaldehyde binder, in some instances amounting to 60 percent by weight of the product. "Resin loss" is also due to the large volume of steam and air present in the forming hood or blow chamber, wherein the mineral fibers are formed, which tend to steam distill and entrain the more volatile components of the phenol-formaldehyde binder. In order to decrease the volatilization of the more volatile components of the phenol-formaldehyde binder and thereby increase the binder efficiency, it has been proposed to produce a phenol-formaldehyde product having relatively larger, less volatile molecules. This expedient, however, has invariably led to a degradation of the water-dilutability properties of the phenol-formaldehyde reaction product and also has led to reduced stability of the product itself.

I have now found that the binder efficiency of water-dilutable, heat-hardenable, phenol-formaldehyde reaction products can be unexpectedly increased and the important attributes of water-dilutability, adequate penetration and bonding characteristics, and stability substantially retained, by the addition thereto of a small amount of an acrylamide polymer. Generally, as little as about 0.005 percent acrylamide polymer based on the weight of the solids content of the phenol-formaldehyde reaction product is sufficient to effect a surprising increase in binder efficiency. Higher amounts effect progressively greater improvements. In general, however, it is not particularly advantageous to add more than about 1 per cent by weight since greater amounts do not substantially increase the binder efficiency.

In clarification of the characteristic referred to as water-dilutability, phenol-formaldehyde reaction products are diluted with water to at least 5 times their own volume before being sprayed onto the mineral fibers in a manner as previously described. The product must be capable of such dilution in order to form a clear, homogeneous, single phase mixture which will not separate out into a solids phase and an aqueous phase. Such a separation causes the spray nozzles to become clogged and interrupts the proper and continuous operation of the process.

Water-dilutability, sometimes called water-miscibility, is determined by adding known increments of distilled water, which has been adjusted to a temperature of 25° C., to a known volume of phenol-formaldehyde product at 25° C. until the appearance of a clouding or turbidity which is not dissipated by thorough mixing. The maximum amount of distilled water which can be added before the appearance of a persistent cloudiness or turbidity, expressed as "percentage by voume" is the percent water-dilutability of the product. For example, a product that can be diluted in this manner with a maximum of 15 times its own volume is said to have a water-dilutability of 1500 percent. Values exceeding 2500 percent are not distinguished definitely but are reported merely as 2500+ percent. For purposes of this invention the phenol-formaldehyde reaction products must have a minimum water-dilutability of about 500 percent.

With respect to adequate penetration and bonding characteristics, these properties are possessed by water-dilutable heat hardenable phenol-formaldehyde reaction products which do not "spray dry." "Spray dry" is the term which is given to describe the premature drying or curing of the binder in the forming hood wherein the binder is sprayed onto the mineral fibers. Particles which "spray dry" are incapable of performing any fiber-to-fiber bonding and appear in the final structure as infusible, insoluble powdery material. This deficiency makes it necessary to employ commensurately greater amounts of binder in order to produce a properly bonded mineral fiber structure.

The bonding and penetration characteristics of a particular phenol-formaldehyde binder are conveniently evaluated by the so-called "disc test" wherein a circular section of an unsized fiber glass cloth, 6 inches in diameter, is sprayed on one side with 10 milliliters of an aqueous binder solution containing about 50 percent solids. The solution is sprayed onto the glass cloth by means of a stream of air preheated to a temperature of about 210°–230° C. The spraying is conducted over a five minute period and the coated cloth disc is allowed to remain in the air stream for an additional five minutes. The coated disc is then removed and examined visually. The degree of binder penetration is readily determined by observing the extent to which the binder penetrates the interstices of the weave of the cloth and the amount of binder which appears on the reverse side of the glass cloth disc. A uniform appearing glossy coating on the cloth disc is indicative of the absence of spray-dried particles, whereas a non-uniform, dull appearing coating indicates irregular binder-to-glass adhesion and the presence of spray dried particles. The stiffness of the coated glass cloth indicates the relative bonding strength of the binder.

Acrylamide polymer as used herein refers to acrylamide homopolymers wherein between about 0.5 to about 40 percent of the amide groups have been hydrolyzed or otherwise replaced by carboxyl groups; to N-alkyl substituted acrylamide homopolymers; and also to acrylamide copolymers. The N-alkyl substituted homopolymers and the acrylamide copolymers contain an average of at least about 60 percent by weight of the combined N-alkyl substituted acrylamide or the combined acrylamide. The N-alkyl substituted acrylamide homopolymers and acrylamide copolymers can, if desired, also be hydrolyzed under acid or alkaline conditions whereby carboxylic acid groups are introduced into the polymer molecule, replacing a portion of the amide groups. In such instances the extent of hydrolysis is controlled so that the acrylamide polymer still contains at least about 60 percent by weight of the acrylamide unit:

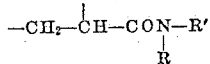

wherein R and R′ are hydrogen and/or alkyl and/or hydroxy substituted alkyl. Illustrative of N-alkyl substituted acrylamide monomers which can be polymerized to produce polymers suitable for purposes of this invention are: N,N-dimethyl acrylamide, N-methyl acrylamide, N,N-diethyl acrylamide, N-ethyl acrylamide, N,N-dipropylacrylamide, N-propyl acrylamide, N,N-dibutyl acrylamide, N-butyl acrylamide, N-allyl acrylamide, N,N-diallyl acrylamide, N-methylol acrylamide, N,N-dimethylol acrylamide.

Illustrative of monomers which can be copolymerized with acrylamide are monoethylenically unsaturated copolymerizable monomers, i.e., compounds containing a single $CH_2=C<$ grouping, for example, vinyl esters, such as vinyl acetate, vinyl propionate, and vinyl butyrate; vinyl ethers, such as vinyl methyl ether, vinyl ethyl ether, vinyl isobutyl ether, 2-chloroethyl vinyl ether; the vinyl and vinylidene halides such as the vinyl and vinylidene chlorides, bromides and fluorides; allyl type alcohols such as allyl alcohol, methallyl alcohol, ethallyl alcohol; unsaturated monohydric alcohol esters of monobasic acids such as allyl and methallyl acetates and laurates; acrylic acid and alkacrylic acids such as methacrylic and ethacrylic acids; esters of acrylic acid such as methacrylate, methyl methacrylate, ethyl methacrylate, propyl methacrylate, butyl methacrylate; amides such as N-(dimethylaminopropyl) acrylamide, methacrylamide, N-methyl acrylamide, N-ethyl acrylamide, N-propyl acrylamide, N-butyl acrylamide, N-methyl methacrylamide, N-ethyl methacrylamide, N-propyl methacrylamide, N-butyl methacrylamide; methacrylonitrile, ethacrylonitrile, aromatic and aliphatic vinyl compounds such as isobutylene, styrene, dichlorostyrene and vinyl naphthalene; alpha,beta-unsaturated polycarboxylic acids and alkyl esters thereof such as maleic, fumaric, citraconic, itaconic acids and the dimethyl, diethyl, dipropyl and dibutyl esters thereof.

A particularly effective material for purposes of this invention is a polyacrylamide sold under the trade name of Separan 2610 by the Dow Chemical Company. This acrylamide polymer is a polyacrylamide hydrolyte having a maximum of about 15 percent of the amide groups of the polymer replaced by carboxyl groups and also having a viscosity of at least about 2 centipoises as determined on an aqueous solution adjusted to a pH of between 3 and 5 and a temperature of 21.5° C., and containing 0.5 percent by weight of the polymer hydrolyte in distilled water. The viscosity is determined using a standard Ostwald viscometer.

The acrylamide polymers and co-polymers can be prepared by any of the methods now well known to those skilled in the art.

The water-dilutable, heat-hardenable phenol-formaldehyde reaction products are generally prepared by reacting together a phenol such as phenol, cresol, or xylenol with from about 1 to 4 moles of formaldehyde, in the form of formalin or paraformaldehyde, per mole of phenol. The reaction is generally conducted in the presence of an alkaline catalyst such as an alkaline metal hydroxide or carbonate; an alkaline earth metal oxide or hydroxide; or quaternary ammonium hydroxides having an ethyl, aryl, hydroxyalkyl or tertiary amine substituents. The reaction may be conducted at atmospheric pressure or under a vacuum and the reaction mixture can be wholly or partially neutralized with mineral or organic acids or salts thereof. For a further explanation and discussion of reactants and procedures which can be used to produce water-dilutable, heat-hardenable phenol-formaldehyde reaction products reference is made to United States Patents 2,034,457 to Bender, 2,190,672 to Meharg and 2,758,101 to Shappell which are herewith incorporated by reference.

To further illustrate the increased binder efficiency imparted to water-dilutable, heat-hardenable phenol-formaldehyde reaction products by the addition thereto of an acrylamide polymer while the important attributes of water-dilutability, stability, and good bonding and penetration characteristics are retained, a number of phenol-formaldehyde products were prepared and tested as to binder efficiency and the previously described attributes before and after the addition thereto of acrylamide polymers.

The phenol-formaldehyde reaction products and their method of preparation are described below.

PREPARATION OF REACTION PRODUCT "A"

A mixture of 4500 grams of phenol, 9000 grams of a 37 percent aqueous formaldehyde solution, and 614 grams of 25% aqueous sodium hydroxide solution was vacuum refluxed at 70° C. for 3.5 hours, and cooled to 40° C. The pH of the reacted mixture was adjusted to 7.65 by the addition thereto of 207 grams of boric acid, and thereafter the mixture was partially dehydrated to a refractive index of 1.544 by vacuum distilling off the water at a pressure of about 25-75 mm. of Hg and a pot temperature of about 40-50° C. The reaction product so obtained had a solids content of 72 percent and a water-diultability of 2500+ percent.

PREPARATION OF REACTION PRODUCT "B"

A mixture of 4500 grams of phenol, 9000 grams of a 37 percent aqueous formaldehyde solution, and 614 grams of a 25 percent aqueous sodium hydroxide solution was vacuum refluxed at 70° C. for 2.25 hours and cooled to 40° C. The pH of the reacted mixture was adjusted to 7.52 by adding thereto 1080 grams of 10.5 percent strength hydrochloric acid, and thereafter partially dehydrated to a refractive index of 1.556 by vacuum distillation at about 40-50° C. and about 25-75 mm. pressure of Hg. The reaction product so obtained had a solids content of about 72 percent and a water-dilutability of 2500 percent.

PREPARATION OF REACTION PRODUCT "C"

A mixture of 900 grams of phenol, 2583 grams of a 37 percent aqueous formaldehyde solution and 225 grams of a 25 percent aqueous sodium hydroxide solution was vacuum refluxed at 70° C. for two hours and cooled to 40° C. The pH of the reacted mixture was adjusted to 7.5 by adding thereto 418.5 grams of 10.5 percent strength hydrochloric acid. The reacted mixture was partially dehydrated by vacuum distillation at 40-50° C. and 50-75 mm. pressure of Hg until 1775 grams of the distillate were collected. The reaction product so obtained had a solids content of about 69 percent and a water-dilutability of 2500+ percent.

PREPARATION OF REACTION PRODUCT "D"

A mixture of 100 parts by weight phenol, 128.5 parts by weight of a 37 percent aqueous foramldehyde solution and 8.2 parts by weight of a 25 percent aqueous sodium hydroxide solution was vacuum refluxed at 60° C. for 4 hours and cooled to 40° C. The pH of the reacted mixture was adjusted to 7.65 by adding 8.23 parts by weight of a 25 percent strength phosphoric acid. The mixture was partially dehydrated by vacuum distillation at 40-50° C. and 50-75 mm. of Hg pressure until 70 parts by weight of distillate were collected. The distillate was cooled to 20° C. and the precipitated salts removed therefrom by filtration. The reaction product so obtained had a solids content of about 65 percent and a water dilutability of 2500+ percent.

The phenol-formaldehyde reaction products prepared as described were used to illustrate this invention, as indicated by the following examples which are illustrative and are not intended to limit in any way the scope of the invention.

*Example I*

A 1% aqueous solution of a polyacrylamide hydrolyte sold under the trade name of Separan 2610, which has been previously described in this specification, was prepared by dissolving 1 part by weight of Separan 2610 in 99 parts by weight of distilled water. Different amounts of this solution were added to the various phenol-formaldehyde reaction products previously described and the mixtures were agitated for a few minutes to insure homogeneity. The particular phenol-formaldehyde products and the relative proportions of Separan 2610 employed in each case are shown in the several tables under the column headed "Compositions." The improved phenol-formaldehyde compositions so prepared were diluted with distilled water to about a 50 percent solids content and tested for binder efficiency, water-dilutability, and bonding and penetration characteristics by the methods previously described.

| Composition | | Properties | | |
|---|---|---|---|---|
| Water-dilutable, heat hardenable phenol-formaldehyde | Weight of Separan 2610 in percent based on the weight of the solids content of the phenol-formaldehyde reaction product | Water-dilutability (percent) | Binder Efficiency (percent) | Bonding and Penetrating Characteristics |
| 1. Product "A"—control | 0 | 2,500+ | 72.5 | dull surface; poor penetration. |
| 2. Product "A" | 0.05 | 2,500+ | 84.5 | glossy surface, good penetration. |
| 3. Product "A" | 0.20 | 2,500+ | 89.6 | glossy surface, excellent penetration. |
| 4. Product "B"—control | 0 | 2,500+ | 64.2 | glossy surface, good penetration. |
| 5. Product "B" | 0.005 | 2,500+ | 66.8 | Do. |
| 6. Product "B" | 0.01 | 2,500+ | 67.3 | Do. |
| 7. Product "B" | 0.02 | 2,500+ | 70.2 | Do. |
| 8. Product "B" | 0.05 | 2,500+ | 71.8 | glossy surface, excellent penetration. |

The results tabulated in the preceding table show that by adding as little as 0.005 percent by weight of an acrylamide polymer to a phenol-formaldehyde reaction product, the binder efficiency of the product is increased with no accompanying degradation of the water-dilutability and bonding and penetrating characteristics of the product. In fact, in some instances, as is shown in the table, the bonding and penetrating characteristics are actually improved along with the increase in binder efficiency.

*Example II*

In order to show that there is no substantial degradation of the water-dilutable properties of heat-hardenable phenol-formaldehyde reaction products containing an acrylamide polymer, 3 acrylamide polymer modified compositions of Product "A," previously described in this specification and one control composition of Product "A" containing no acrylamide polymer were tested for water-dilutability after aging for a period of 1 through 7 days. The three modified compositions contained 0.005, 0.05, and 0.10 percent by weight of Separan 2610 based on the weight of the solids content of Product "A." Each modified composition was found to have the same water-dilutability value as did the control composition and to have retained this water-dilutability after aging for 7 days as determined by the water-dilutability test previously described.

*Example III*

A polyacrylamide hydrolyte (Separan 2610), a copolymer of acrylamide and N-(dimethylaminopropyl) acrylamide, and a homopolymer of N,N-dimethyl acrylamide were added to samples of phenol-formaldehyde products; Product "A," Product "B," Product "C" and Product "D" which have been previously described and the modified compositions tested for binder efficiency. The data obtained is tabulated below.

The copolymer of acrylamide and N-(dimethylaminopropyl) acrylamide containing 69 percent by weight of acrylamide, and having a viscosity of 52 centistokes as determined on a 0.25 percent aqueous solution, was prepared by reacting a mixture of 5 moles of acrylamide and 1 mole of N-(dimethylaminopropyl) acrylamide. The mixture was neutralized with acetic acid, diluted to form a 10 percent aqueous solution and polymerization conducted in the presence of a catalytic amount of potassium persulfate.

The N,N-dimethyl acrylamide homopolymer has a maximum viscosity of about 200,000 centipoises as determined, using a Brookfield viscometer, on a 7.5 percent aqueous solution at 25° C. The polymer is water-soluble and was prepared by forming a 10 percent solution in water of the N,N-dimethyl acrylamide and conducting the polymerization reaction in the presence of a catalytic amount of potassium persulfate.

The polyacrylamide hydrolyte (Separan 2610) was added to the phenol-formaldehyde reaction products in the form of a one percent aqueous solution, prepared by dissolving 1 part by weight of Separan 2610 in 99 parts by weight of distilled water.

| | Compositions | | Properties |
|---|---|---|---|
| (1) | (2) | (3) | (4) |
| Water-Dilutable Phenol-Formaldehyde Reaction Product | Acrylamide Polymer | Wt. Percent of the Acrylamide Polymer Based on Solids Content of (1) | Binder Efficiency (Percent) |
| 1. Product "A"—control. | 0 | | 62 |
| 2. Product "A" | Separan 2610 | 0.05 | 76 |
| 3. Product "A" | Acrylamide, N-(dimethylaminopropyl) acrylamide copolymer. | 0.05 | 75 |
| 4. Product "B"—control. | 0 | | 64 |
| 5. Product "B" | Separan 2610 | 0.05 | 72 |
| 6. Product "B" | Acrylamide, N-(dimethyl-aminopropyl) acrylamide copolymer. | 0.05 | 72 |
| 7. Product "B" | N,N-dimethyl acrylamide polymer. | 0.05 | 71 |
| 8. Product "C"—control. | 0 | | 79 |
| 9. Product "C" | Separan 2610 | 0.05 | 87 |
| 10. Product "C" | Acrylamide, N-(dimethyl-aminopropyl) acrylamide copolymer. | 0.05 | 87 |
| 11. Product "D"—control. | 0 | | 36 |
| 12. Product "D" | Separan 2610 | 0.05 | 46 |
| 13. Product "D" | Acrylamide, N-(dimethyl-aminopropyl) acrylamide copolymer. | 0.05 | 50 |

The tabulated data clearly shows the relatively high increase in binder efficiency imparted to water-dilutable heat-hardenable phenol-formaldehyde reaction products by the addition thereto of an acrylamide polymer. In addition, each composition, modified by an acrylamide polymer was tested and found to have a high and commercially acceptable water-dilutability.

*Example IV*

A 69 percent by weight aqueous solution of 2,4,6-tris(hydroxymethyl)phenol was prepared by dissolving 69 parts by weight of the said phenol in 31 parts by weight water. The solution was found to have a water-dilutability of 2500+ percent and to contain 63.4 percent solids when tested by the methods previously described. Three compositions were prepared by adding various amounts of Separan 2610 to the 2,4,6-tris(hydroxymethyl)phenol in a manner described in Example I. Each of the modified compositions had substantially the same water-dilutability and stability as the unmodified phenol. The binder efficiency and bonding characteristics are tabulated below.

| Weight percent of Separan 2610 based on the weight of 2,4,6-tris(hydroxymethyl)phenol | Binder Efficiency, percent | Water-Dilutability (percent) | Bonding and Penetrating Characteristics |
|---|---|---|---|
| 1. 0—control | 72 | 2,500+ | glossy surface, fair penetration. |
| 2. 0.01 | 76 | 2,500+ | glossy surface, good penetration. |
| 3. 0.16 | 84 | 2,500+ | glossy surface, excellent penetration. |

Again the tabulated results show that an acrylamide polymer improves the binder efficiency of a phenol-formaldehyde reaction product while maintaining and in some cases improving the attributes of water-dilutability and good bonding and penetrating characteristics.

*Example V*

Two compositions of Product "B" and Separan 2610 were prepared wherein each composition contained 0.05 percent by weight of Separan 2610, in the form of a one percent aqueous solution. In one case the Separan 2610 was added to the phenol-formaldehyde product before dehydration. In the other case the Separan 2610, also in the form of a one percent aqueous solution, was added after dehydration of the phenol-formaldehyde product to a refractive index of 1.5561. The compositions were tested for water-dilutability and binder efficiency by tests previously described. Tabulated data obtained from these tests is shown below:

| Composition | Water-dilutability (percent) | Binder Efficiency (percent) |
|---|---|---|
| Product "B" with no Separan 2610 | 2,500 | 64 |
| Product "B" with 0.05% Separan 2610 added to dehydrated product | 2,500 | 72 |
| Product "B" with 0.05% Separan 2610 added to product before dehydration | 2,500 | 75 |

The water-dilutable, heat-hardenable phenol-formaldehyde reaction products can be used as the sole binder for mineral fibers as shown by the several examples. On the other hand, when desired, they can be admixed or extended with other resins. Acidic natural resins available at comparatively low prices, such as rosin and derivatives thereof, particularly that sold under the trademark name 'Vinsol,' are useful as extenders, particularly when they are incorporated in emulsified form.

"Vinsol" is the trade name for the rosin-like material remaining after the distillation of rosin from pine stumps, and is marketed by the Hercules Powder Company. It is both phenolic and acidic in its chemical behavior. It is usually applied, in the form of an aqueous emulsion or suspension, in admixture with the water-dilutable phenol-formaldehyde reaction products, to the mineral fibres and eventually becomes a part of the hardened (insolube and infusible) binder.

Urea and urea-formaldehyde resins can also be added to the phenol-formaldehyde reaction products where desired for the express purpose of preventing so-called "punking" which occasionally occurs when the glass fiber batts containing the cured phenol-formaldehyde reaction product are subjected to relatively high temperatures.

What is claimed is:
1. A heat-hardenable composition comprising a water-dilutable, heat-hardenable phenol-formaldehyde reaction product and an acrylamide polymer selected from the group consisting of hydrolyzed acrylamide homopolymers having from about 0.5 to about 40 percent of the amide groups of said homopolymer replaced by carboxyl groups, N-alkyl substituted acrylamide homopolymers, hydrolyzed N-alkyl substituted acrylamide homopolymer containing at least about 60 percent by weight combined N-alkyl substituted acrylamide, and copolymers of acrylamide containing at least about 60 percent by weight combined acrylamide, and up to 40 percent by weight of a monoethylenically unsaturated copolymerizable monomer, said acrylamide polymer being present in an amount of from about 0.005 to about 1 percent by weight based on the solids content of the phenol-formaldehyde reaction product.

2. A heat-hardenable composition as defined in claim 1 wherein the phenol-formaldehyde product is the reaction product of phenol and formaldehyde.

3. A heat-hardenable composition as defined in claim 1 wherein the phenol-formaldehyde product is the reaction product of cresol and formaldehyde.

4. A heat-hardenable composition as defined in claim 1 wherein the phenol-formaldehyde product is the reaction product of xylenol and formaldehyde.

5. A heat-hardenable composition as defined in claim 1 wherein the acrylamide polymer is an acrylamide homopolymer having from about 0.5 to about 40 percent of the amide groups therein replaced by carboxyl groups.

6. A heat-hardenable composition as defined in claim 1 wherein the acrylamide polymer is a N,N-dimethyl acrylamide homopolymer.

7. A heat-hardenable composition as defined in claim 1 wherein the acrylamide polymer is a copolymer of acrylamide and N-(dimethylaminopropyl) acrylamide containing at least about 60 percent by weight combined acrylamide.

8. A heat-hardenable composition as defined in claim 1 wherein the acrylamide polymer is an acrylamide homopolymer having from about 0.5 to about 15 percent of the amide groups therein replaced by carboxyl groups.

9. Method of improving the binder efficiency of a water-dilutable, heat-hardenable phenol-formaldehyde reaction product which comprises adding to said phenol-formaldehyde product an acrylamide polymer selected from the group consisting of hydrolyzed acrylamide homopolymers having from about 0.5 to about 40 percent of the amide groups of said homopolymer replaced by carboxyl groups, N-alkyl substituted acrylamide homopolymers, hydrolyzed N-alkyl substituted acrylamide homopolymer containing at least about 60 percent by weight combined N-alkyl substituted acrylamide, and copolymers of acrylamide containing at least about 60 percent by weight combined acrylamide, and up to 40 percent by weight of a monoethylenically unsaturated copolymerizable monomer, said acrylamide polymer being present in an amount of from about 0.005 to about 1 percent by weight based on the solids content of the phenol-formaldehyde reaction product.

10. Method as defined in claim 9 wherein the acrylamide polymer is an acrylamide homopolymer having from about 0.5 to about 40 percent of the amide groups therein replaced by carboxyl groups.

11. Method as defined in claim 9 wherein the acrylamide polymer is an acrylamide homopolymer having from about 0.5 to about 15 percent of the amide groups therein replaced by carboxyl groups.

12. Method as defined in claim 9 wherein the phenol-formaldehyde product is a reaction product of phenol and formaldehyde.

13. Method as defined in claim 9 wherein the acrylamide polymer is an N,N-dimethyl acrylamide homopolymer.

14. Method as defined in claim 9 wherein the acrylamide polymer is a copolymer of acrylamide and N-(dimethylaminopropyl) acrylamide containing at least about 60 percent by weight combined acrylamide.

15. The hardened product of the composition defined in claim 1.

16. The hardened product of the composition defined in claim 2.

17. The hardened product of the composition defined in claim 6.

18. The hardened product of the composition defined in claim 7.

19. The hardened product of the composition defined in claim 8.

References Cited in the file of this patent
UNITED STATES PATENTS

| | | |
|---|---|---|
| 2,293,413 | Stoner et al. | Aug. 18, 1942 |
| 2,336,792 | Langkammerer et al. | Dec. 14, 1943 |
| 2,475,846 | Lundberg | July 12, 1949 |
| 2,819,237 | Daniel | Jan. 7, 1958 |